United States Patent [19]
Kao

[11] Patent Number: 5,280,266
[45] Date of Patent: Jan. 18, 1994

[54] VISITOR SENSING DEVICE

[76] Inventor: Yao-Tzung Kao, No. 28, Lane, 33, Section 2, Yi-An Road, Tainan City, Taiwan

[21] Appl. No.: 848,278

[22] Filed: Mar. 9, 1992

[51] Int. Cl.$^5$ .............................................. G08B 3/00
[52] U.S. Cl. .................................. 340/330; 340/541; 358/85; 358/108
[58] Field of Search ............... 340/330, 326, 328, 331, 340/332, 286.11, 541, 565, 529; 358/108, 85; 379/171, 167, 53, 54

[56] References Cited

U.S. PATENT DOCUMENTS

| | | | |
|---|---|---|---|
| 3,482,037 | 12/1969 | Brown | 358/108 |
| 4,023,151 | 5/1977 | Markham | 340/328 |
| 4,232,196 | 11/1980 | Filippi | 358/108 |
| 4,370,675 | 1/1983 | Cohn | 358/108 |
| 4,764,755 | 8/1988 | Pedtke et al. | 340/529 |
| 4,843,461 | 6/1989 | Tatsumi et al. | 358/85 |
| 5,155,474 | 10/1992 | Park et al. | 340/541 |

FOREIGN PATENT DOCUMENTS 410099 1/1992 Japan ..................... 340/541

*Primary Examiner*—Brent Swarthout
*Attorney, Agent, or Firm*—Morton J. Rosenberg; David I. Klein

[57] ABSTRACT

A visitor sensing device capable of being combined with a conventional door intercom is provided. The device includes a detecting circuit to be installed adjacent a door of a house, for sensing the presence of a visitor standing in front of the door for a preset period of time. Responsive to detecting a visitor, the detecting circuit sends a signal to a converting circuit. The converting circuit converts the signal received from the detecting circuit into a monostable pulse to be fed to a vision circuit, which then displays an image of a visitor on its screen and also actuates an audio circuit. The audio circuit includes a buzzer to generate an audio signal.

1 Claim, 1 Drawing Sheet

VISITOR SENSING DEVICE

BACKGROUND OF THE INVENTION

This invention concerns a visitor sensing device which can be combined with a conventional door intercom. It can automatically sense a visitor and display the image of a visitor on the screen of a monitor and to trigger a buzzer.

SUMMARY OF THE INVENTION

This invention has been devised to offer a visitor sensing device which can be combined with a conventional door intercom.

The visitor sensing device in the present invention comprises a detecting circuit, a converting circuit, a vision circuit and an audio circuit. The detecting circuit is to be installed beside a door or a gate of a house and the rest of the circuits are installed in an appropriate place in the house. When a visitor appears in front of the door and stops there for more than a preset period of time, for example 7-10 seconds, the detecting circuit sends out a signal to the converting circuit, which then operates to send an output of a monostable pulse to the vision circuit to enable a monitor for a display of an image of the visitor. The vision circuit sends out a time delayed signal to the audio circuit to trigger a buzzer, which then generates an audible signal to attract the attention of a person in the house.

BRIEF DESCRIPTION OF A DRAWING

FIG. 1 is an electrical schematic diagram of the present invention.

DETAILED DESCRIPTION OF THE INVENTION

Figure 1:
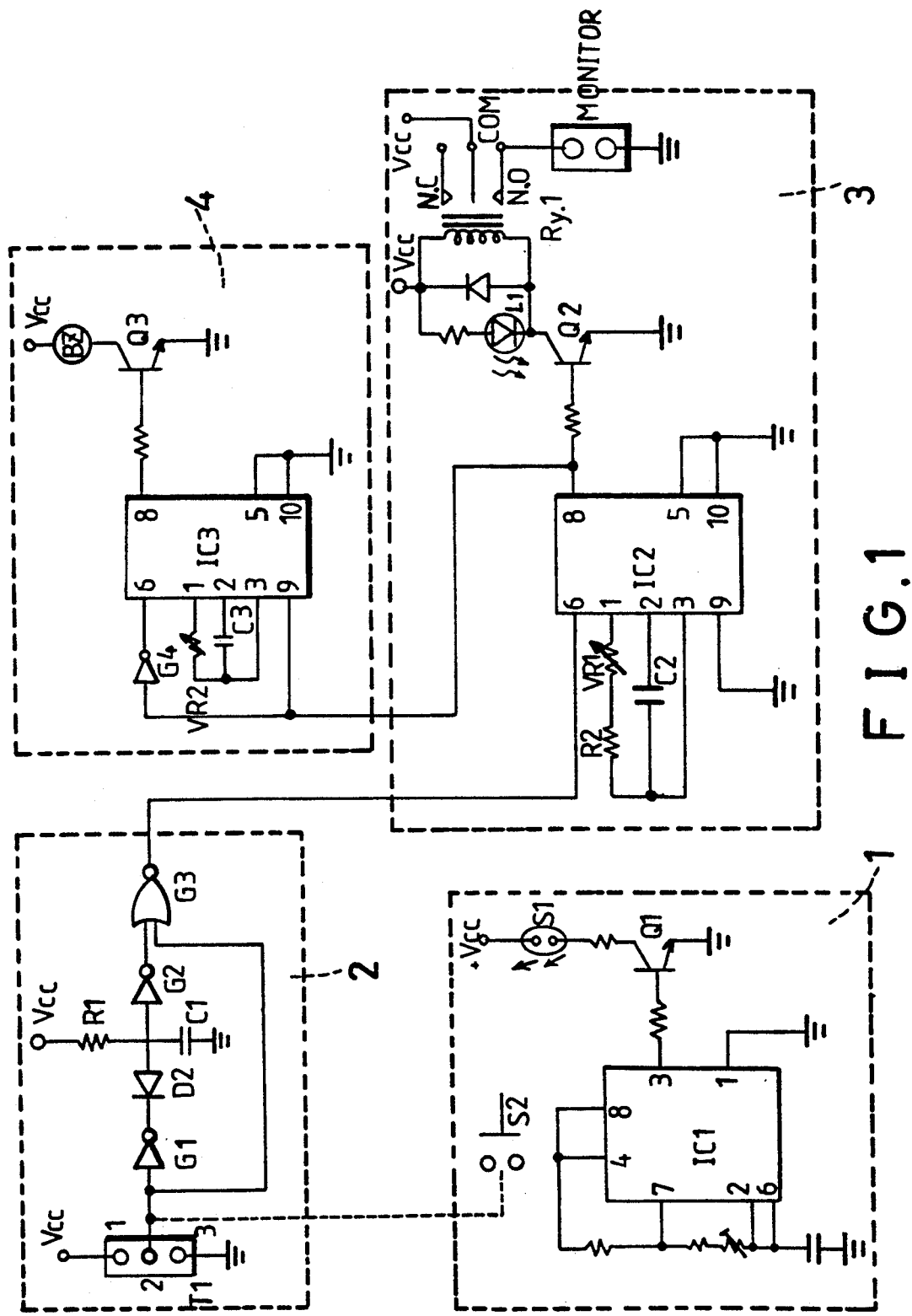

The visitor sensing device of the present invention, as shown in FIG. 1, comprises a detecting circuit 1, a converting circuit 2, a vision circuit 3 and an audio circuit 4, connected together as will be described in following paragraphs.

The detecting circuit 1 is affixed to the outside of a house, adjacent a door or gate thereof. The detecting circuit 1 includes a detecting integrated circuit IC1, a transistor Q1, a sensing member S1, such as an electronic eye or a button switch S22, four resistors and a variable resistor connected together. Pin 3 of IC1 is connected in series with one of the resistors and the base of the transistor Q1, which has its collector connected in series with another resistor and the sensing member S1 or the button switch S2.

The converting circuit 2 receives a sensed signal from the sensing member S1 to convert it into a monostable pulse output signal. The converting circuit 2 includes a converter T1, two NOT gates G1, G2, a NOR gate G3, a diode D2, a capacitor C1 and a resistor R1, connected together. Pin 2 of the converter T1 is connected to the input of the NOT gate G1, which has its output connected to the cathode of diode D2. The anode of diode D2 is connected to the resistor R1, the capacitor C1 and the input of another NOT gate G2. The output of NOT gate G2 is connected to one input of the NOR gate G3, and the other input of NOR gate G3 is connected to pin 2 of the convertor T1.

The vision circuit 3 receives the pulse output coming from the converting circuit 2 to actuate a monitor, which displays an image of a visitor standing in front of the door of a house. The vision circuit 3 has a delay IC2, a transistor Q2, a signal lamp L1, a relay Ry1, a monitor, a variable resistor VR1, two resistors and a capacitor C2 connected together. Pin 6 of the IC2 is connected to the output pin of the NOR gate G3 of the converting circuit 2, to receive a pulse signal therefrom. Pin 8 of the IC2 is connected in series with a resistor and the base of the transistor Q2, which has its collector connected to the relay Ry1 and the signal lamp L1. The normally open contact point N.O of the relay Ry1 is connected to the monitor. The delay time of the IC2 is dependent on and adjusted by the variable resistor VR1 and the value of capacitor C2.

The audio circuit 4 provides an audio output synchronously with operation of the vision circuit 3. The audio circuit 4 includes a NOT gate G4, a delay IC3, a transistor Q3, a variable resistor VR2, a capacitor C3 and a resistor. Pin 6 of the IC3 is connected to the output of the NOT gate G4, the input of which is connected to the output, pin 8, of IC2 in the vision circuit 3. The output, pin 8, of the IC3 is connected in series with a resistor and the base of the transistor Q3. The collector of transistor Q3 is connected to one terminal of the buzzer BZ, the other terminal of which is connected to the power supply terminal Vcc.

The detecting circuit 1 is installed adjacent the door of a house, while the remaining circuits, 2, 3 and 4 are installed at an appropriate place within the house and properly wired together. Then, if a visitor stands in front of the door for more than a preset period of time, for example 7-10 seconds, then the sensing member S1 of detecting circuit 1 sends a signal to the converting circuit 2. When the converter T1 in the converting circuit 2 receives the signal from detecting circuit 1, it outputs a low potential to the NOT gate G1. NOT gate G1 outputs a high potential to the diode D2, which is thereby biased off. Current from the Vcc terminal flows through the resistor R1 and charges the capacitor C1, changing a low potential input of the NOT gate G2 to high potential, and the high potential output thereof into low potential. The low potential output of gate G2 is fed, together with another signal of low potential, to the inputs of the NOR gate G3. The output of the NOR gate G3 outputs monostable pulse to the delay IC2 in the vision circuit 3 responsive to the input signals coupled thereto.

When pin 6 of the delay IC2 receives the pulse from the output of the NOR gate G3, pin 8 outputs a signal after a delay time determined by the variable resistor VR1 and the value of capacitor C2. The output from pin 8 of IC2 turns on the transistor Q2, to light up the signal lamp L1, and simultaneously actuate the relay Ry1 to close the contact points C and N.O. and thereby enable the monitor. At the same time, the audio circuit 4 will be enabled by the output of IC2, as pin 8 of IC2 is connected to the input of the NOT gate G4 and pin 9 of IC3 in the audio circuit 4. When pin 6 of the delay circuit IC3 is actuated by an output signal from pin 8 of IC2, through the invertor G4, IC3 outputs a signal delayed in time. The delay time being determined by the variable resistor VR2 and the value of capacitor C3, to turn on the transistor Q3 to power the buzzer BZ, audibly indicating that a visitor has come, while the monitor provides an image of a visitor as a visual indication thereof.

What is claimed is:

1. A visitor sensing device disposed outside of a house adjacent a door thereof, comprising:

a detecting circuit for detecting the presence of a visitor in proximity to a door of a house, said detecting circuit having a output terminal for providing an output signal responsive to detection of said presence of a visitor for a time period greater than a predetermined time;

a converting circuit for converting said output signal from said detecting circuit to a monostable pulse signal, said converting circuit having an input terminal coupled to said output terminal of said detecting circuit, said converting circuit having an output terminal for providing said monostable pulse signal;

a vision circuit having an input coupled to said output terminal of said converting circuit for enabling a visual display monitor subsequent to a first predetermined delay time period responsive to receipt of said monostable pulse signal, said vision circuit including a first time delay circuit having an input terminal coupled to said output terminal of said converting circuit, said vision circuit further including a first switching circuit having an input coupled to an output terminal of said first time delay circuit and an output coupled to said visual display monitor for enabling visual display thereon responsive to an output signal from said first time delay circuit; and, an audio circuit having an input coupled to said output terminal of said first time delay circuit for energizing a buzzer subsequent to a second predetermined time delay period responsive to receipt of said output signal from said first time delay circuit, said audio circuit including a second time delay circuit having an input coupled to said output terminal of said first time delay circuit, said audio circuit further including a second switching circuit having an input coupled to an output terminal of said second time delay circuit and an output coupled to said buzzer for generating an audible signal subsequent to said second predetermined time delay.

* * * * *